United States Patent [19]

Pfalzgraf

[11] Patent Number: 4,761,102
[45] Date of Patent: Aug. 2, 1988

[54] DRILLING HEAD WITH JOINTLY OR INDIVIDUALLY RADIALLY ADJUSTABLE TOOLS

[76] Inventor: Emile Pfalzgraf, 7, rue de Neuwiller, 67330 Bouxwiller, France

[21] Appl. No.: 947,963

[22] Filed: Dec. 30, 1986

[30] Foreign Application Priority Data

Jan. 16, 1986 [FR] France ............................... 86 00814
Aug. 1, 1986 [FR] France ............................... 86 11293

[51] Int. Cl.⁴ ............................................. B23B 51/00
[52] U.S. Cl. ................................... 408/157; 408/173
[58] Field of Search ............... 408/146, 147, 157, 158, 408/173, 177, 178, 179, 181, 161, 162, 168

[56] References Cited

U.S. PATENT DOCUMENTS 3,347,115 10/1967 Koch ..................... 408/146
4,063,843 12/1977 Barkley et al. ............ 408/146
4,162,867 7/1979 Calcaterra et al. .......... 408/157

FOREIGN PATENT DOCUMENTS 207061 7/1921 Fed. Rep. of Germany .
2000184 7/1971 Fed. Rep. of Germany .
2931508 2/1981 Fed. Rep. of Germany .
390124 6/1909 France .
2369046 5/1978 France .

Primary Examiner—Neil Abrams
Attorney, Agent, or Firm—Young & Thompson

[57] ABSTRACT

Drilling head comprising a body for fastening in a mounting support. The body carries a pair of radially movable tools. A casing is mounted for axial displacement along a bore in the body, the casing being rotatable relative to the body about the axis of the bore. Structure is provided for rotating the casing in the bore and for moving the casing axially along the bore. The casing supports pins which are engageable with both tools of the pair of radially movable tools and which in one axial position of the casing along the bore move both tools in opposite axial directions upon rotation of the casing and which in another axial position of the casing along the bore contact only one tool to move only that one tool radially relative to the other tool.

13 Claims, 2 Drawing Sheets

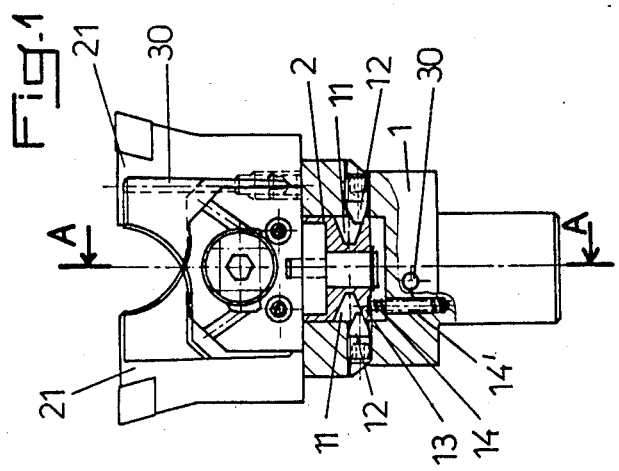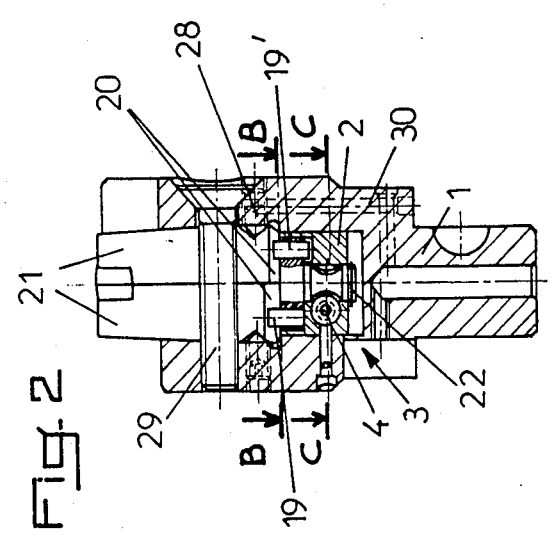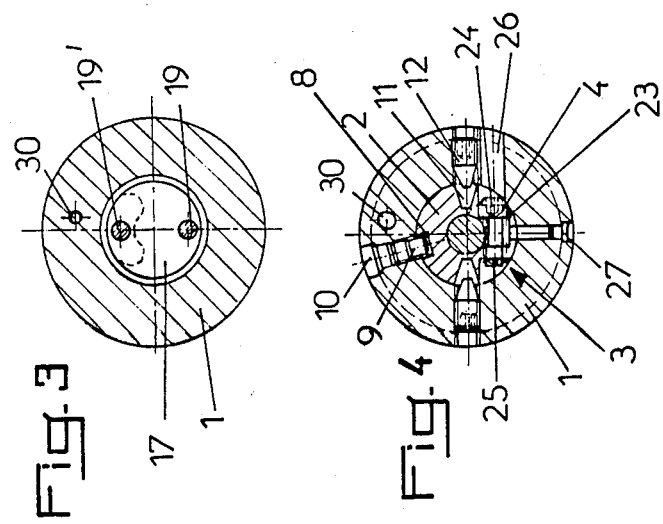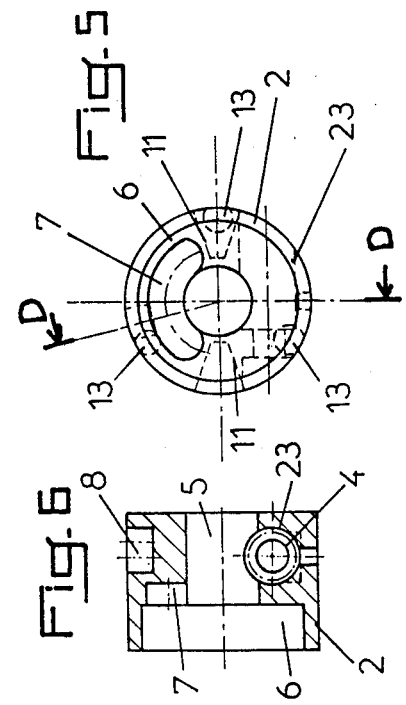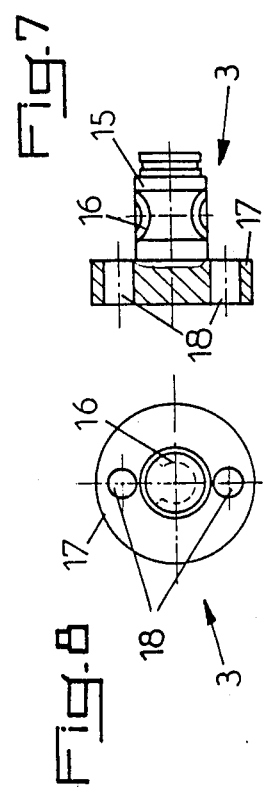

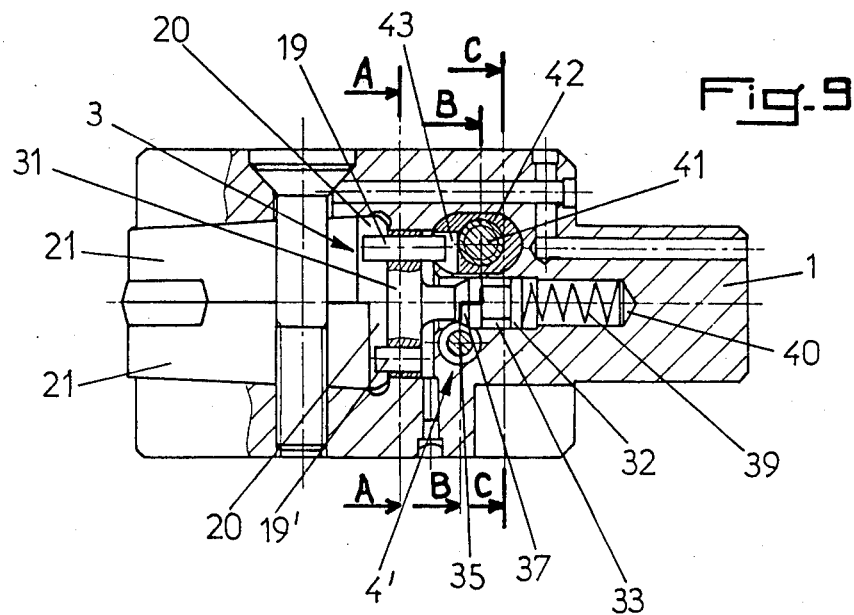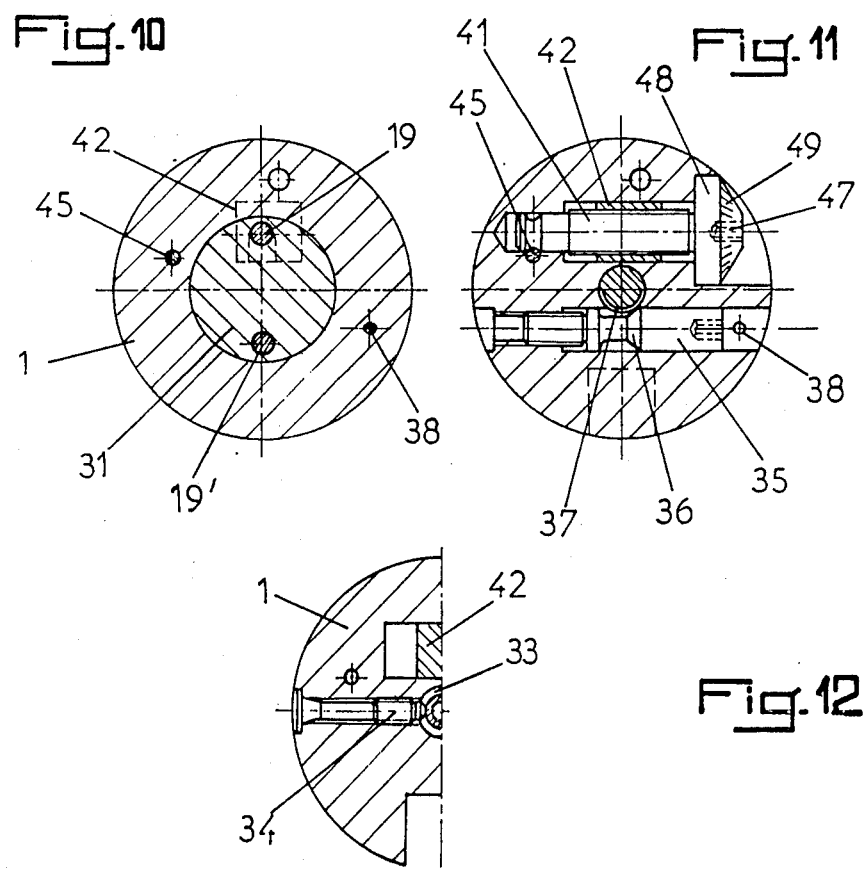

DRILLING HEAD WITH JOINTLY OR INDIVIDUALLY RADIALLY ADJUSTABLE TOOLS

The present invention relates to the field of machining by drilling using conventional or numerically controlled machines, in machine shops or by means of equipment in general purpose establishments, and has for its object a drilling head.

Rough-shaping heads having plate holders that are separately adjustable in diameter and one of which plate holders is separately adjustable in height, are known from France No.-A-2 563,132 and from the corresponding certificate of addition application No. 84 14 315.

These drilling heads have certain advantageous features, but are encumbered with the necessity of adjusting on a preadjustment bench, or by means of special adjusting devices.

The present invention has as as object to overcome these disadvantages.

Specifically, it has as an object a drilling head characterized in that it is essentially constituted by a body for fastening in a mounting support, a casing for receiving elements in motion mounted with the possibility of axial displacement in the body, a device for radial adjustment of the tools, and a means for actuating the adjustment device, the adjustment device and the means for actuating being maintained in the casing.

The invention will be better understood thanks to the following description, which relates to a preferred embodiment, given by way of non-limiting example, and explained with reference to the accompanying schematic drawings, in which:

FIG. 1 is a view in elevation and partially in section of a drilling head according to the invention;

FIG. 2 is a sectional view along the line A—A of FIG. 1;

FIG. 3 is a sectional view along line B—B of FIG. 2;

FIG. 4 is a sectional view along line C—C of FIG. 2;

FIG. 5 is a plan view, on an enlarged scale, of the casing 2;

FIG. 6 is a sectional view along line D—D of FIG. 5;

FIG. 7 is a side elevational view, partially in section, of the radial adjustment device;

FIG. 8 is a plan view according to FIG. 7;

FIG. 9 is a view in elevation and partially in section of a variation of the head according to FIG. 1;

FIG. 10 is a sectional view along line A—A of FIG. 9;

FIG. 11 is a sectional view along line B—B of FIG. 9, and

FIG. 12 is a half-view in section along the line C—C of FIG. 9.

According to the invention, and as is shown more particularity by way of example in FIGS. 1 to 4 of the accompanying drawings, the drilling head is essentially constituted by a body 1 for fastening in a mounting support and in which is mounted, with the possibility of axial displacement, a casing 2 for reception of the movable elements, a device 3 for radial adjustment of the tools, and a means 4 for actuating the device 3, this latter and the means 4 being maintained in the casing 2.

The casing 2 (FIGS. 5 and 6) is in the form of a cylindrical element mounted in a receiving bore of the body 1, such that it is adjustable in position, and provided, on the one hand, with a bore 5 opening on the face of the casing 2 directed toward the base of the bore of the body 1, and a bore 6 of greater diameter communicating with the bore 5 and concentric with this latter, and opening on the other face of the casing 2, and, on the other hand, with a circular arc-shaped groove 7 extending partially around the bore 5 in the base of the bore 6, and a closed longitudinal groove 8 extending parallel to its longitudinal axis on an exterior generatrix and cooperating with a screw 9 fixed in the body 1 and forming a stop abutment.

The screw 9 permits, via its positioning in the groove 8, limiting the displacement of the casing 2, and a plug 10, which may advantageously be formed from a synthetic material, is intended to prevent any undesired access to the screw 9.

The casing 2 is moreover provided on its generatrix with two diametrically opposed conical holes 11 cooperating with two conical-headed screws 12 fixed in the body 1 and displacing the casing 2 in the direction of the base of the bore of the body 1, and on its face directed toward the base of the bore of the body 1, at regular intervals, with holes 13 for guiding and maintaining springs 14 loading this said face.

The device 3 for radial adjustment has the form of a shouldered cylindrical element of which the portion 15 of lesser diameter is provided with a helicoidal gearing 16 extending over the majority of its circumference, or over all its circumference, and is housed in the bore 5 of the casing 2, and of which the portion 17 of greater diameter is in the form of a disk housed in the bore 6 of the casing 2 and is provided with two diametrally opposed holes 18 for reception of pins 19 and 19' cooperating with transverse grooves 20 of the tools 21 to be adjusted, the device 3 being disposed freely rotatably in the casing 2 by means of a resilient ring 22 (FIGS. 1, 2, 7 and 8).

The means 4 for actuating the device 3 (FIGS. 2 and 4) is in the form of an endless screw positioned in a housing 23 of the casing 2 tangent and perpendicular to the bore 5 in meshing engagement with the helicoidal gearing 16 of the device 3, this screw 4 being provided at one extremity with an operable polygon in the form of a hexagonal recess 24, accessible through a hole 26 of the body 1, and a resilient ring 25 fixed on is other extremity assuring its maintenance in the housing 23. Lubrication of the connection between the endless screw 4 and the helicoidal tooth 16 is assured by means of a grease cap 27 (FIG. 4).

The pins 19 and 19' are force-fitted or glued in the holes 18 of the portion 17 of greater diameter of the device 3, and one of the pins 19 is mounted projecting toward the corresponding tool 21 and flush with the lower face of the portion 17, whereas the other pin 19' projects from both sides of the portion 17, at a height equal to about half of that by which projects the pin 19 and corresponding to the possible axial displacement of the casing 2 in the bore of the body 1, and penetrates, at its lower portion, into the circular arc-shaped groove 7 of the casing 2, and at its upper portion in the transverse groove 20 of the corresponding tool 21.

Thus, the groove 7 serves as an abutment for the device 3 in the two possible directions of rotation. Moreover, in the upper position of the casing 2, the pins 19 and 19' penetrate into the grooves 20 of the corresponding tools 21, whereas in the lower position of the casing 2, pressing against the action of springs 14 under the gripping force of the screws 12, the pin 19' is no longer in the corresponding groove 20, only the pin 19 remaining partially in the groove 20 to which it corresponds.

The tools 21 are preferably plate holders, and the pins 19 and 19' permit their displacement through the intermediary of the grooves 20.

The springs 14 are intended to apply a constant pressure upwardly of the casing 2 which is retained axially and in rotation thanks to the groove 8 cooperating with the screw 9. Moreover, the spring 14 are guided in deep holes 14' provided in the body 1.

So as to effect symmetrical adjustment of the plate holders 21, the pins 19 and 19' must penetrate into the grooves 20 of the said plate holders 21. First, the casing 2 is arranged in lower position against the action of the springs 14 by screwing of the screws 12 into the holes 11, then the plate holder 21 corresponding to the pin 19 is introduced into the body 1 up to correspondence of its groove 20 with the said pin 19, and next the second plate holder is similarly positioned.

The screws 12 are then unscrewed so as to permit upward displacement of the casing 2 under the pressure of the springs 14, and the second plate holder 21 is displaced so as to permit penetration of the corresponding pin 19' in its groove 20.

When this operation is performed, the screws 28 for leveling the plate holders 20 are tightened slightly and the screw 29 for securing the plate holders in the body 1 is positioned. The endless screw forming the means 4 is then actuated by means of a key and drives the device 3 in rotation in one direction or the other so as to effect the displacement of the plate holders 21 by means of the pins 19 and 19'. Once the requisite setting, measured by means of a slide caliper or any other suitable device, is attained, the plate holders 21 are blocked by means of the wedging screws 28 and the tightening screw 29.

It is also possible to perform a separate or independent adjustment of the plate holders 21 as well as an adjustment in height of one plate holder. To this end, the head is mounted via a preadjustment bench and the central tightening screw 29 is unscrewed and the screws 28 are also slightly unscrewed, then the screws 12 are tightened so as to displace the casing 2 downwardly in the bore of the body 1 against the action of the springs 14 and so as to disengage one of the plate holders 21 entirely from the corresponding pin 19', this plate holder thus being able to be adjusted simultaneously in height. Then the other plate holder 21 is displaced by means of the endless screw 4 acting on the device 3 until it attains the desired setting. Next, the first plate holder 21 is manually adjusted such that it is offset with respect to the other by a width about equal to half the width of the cuttings to be removed. After this radial displacement, the axial displacement of this plate holder, for obtaining the offset in height with respect to the other, is effected in the manner described in France No.A-2 563 132, then the screws 28 and 29 are once again tightened.

On the other hand, the drilling head is provided, in a known manner, with channels 30 for lubrication of the tools.

FIG. 9 shows a variation of the invention, in which the device 3 for radial adjustment of the tools 21 is mounted in the body 1 with the possibility of axial displacement under the action of the actuating means 4', and is constituted in the form of a drive wheel 31, movable in rotation and cooperating, by means of pins 19 and 19', with transverse grooves 20 of the tools 21 to be adjusted in order to displace in one direction or the other these latter with respect to one another.

The pins 19 and 19' are force-fitted or glued in the corresponding holes of the wheel 31.

The wheel 31 comprises, on the side opposite the tools 21, a rod 32 provided near its free extremity with a wide circumferential groove 33 for maintaining its height in the body 1, and into which penetrates a stop screw 34 for limiting the axial displacemnt of the wheel 31 (FIGS. 9 and 12).

The means 4' for effecting axial displacement of the device 3 as constituted by a cam screw 35 extending orthogonally to the axis of the wheel 31 and having in its median portion a clearing of which the extremity opposite to the threading of the screw 35 is in the form of a cone 36 which cooperates with a cone 37 provided on the rod 32 of the wheel 31 between the groove 33 and the said wheel 31, a pin 38, projecting slightly from the housing of the cam screw 35, limiting the displacement of this latter in the direction of removal of its cone 36 from the cone 37 of the wheel 31 (FIG. 11).

The cam screw 35 is provided, in a known manner, with a hexagonal recess for its operation.

The free end of the rod 32 of the wheel 31 is loaded by an axial spring 39 housed in a bore 40 of the body 1 (FIG. 9).

Thus, upon rotation of the cam screw 35, the wheel 31 is displaced thanks to the cooperation of the cones 36 and 37, the spring 39 exerting a continuous pressure on the rod 32 tending to displace the wheel 31 in the direction of the tools 21, the course of this displacement being limited by the stop screw 34.

The drive wheel 31 is driven in rotation by means of an adjustment screw 41 extending orthogonally to the rod 32 of the wheel 31, driving a stud 42 provided with a housing 43 cooperating with one of the pins 19 traversing to this end the wheel 31, and maintained in its housing 44, against translation, by means of a pin 45 cooperating with a throat 46 provided at its end (FIGS. 9 and 12).

Operation of the screw 41 is advantageously performed by means of a hexagonal recess 47, and the head 48 of the screw has a conical surface provided with graduations 49 (FIG. 11). Thus, rotation of the wheel 31 by operation of the screw 41 drives a displacement of the tools or plate holders 21 by means of the pins 19 and 19', one of which, 19, is driven by the stud 42 at the time of its displacement along the screw 41.

The graduations 49 provided on the conical surface of the head 48 of the screw 41 are intended to facilitate adjustment or displacement of the plate holders or tools 21.

Thanks to the invention, it is possible to perform a simultaneous and symmetrical displacement of two tools or plate holders in their housing of a body for fastening through the intermediary of a single adjustment screw. The displacement or the diameter of the said tools or plate holders can be easily measured by means of a slide caliper or a micrometer gauge, and the finest necessary adjustments are facilitated thanks to the graduations 49 of the adjustment screw 41.

The symmetrical and simultaneous displacement of the plate holders or tools 21 is performed when the drive wheel 31 has its surface directed toward the plate holders at the level of the bearing surface of these latter, that is to say when the cone 36 of the cam screw 35 is in its entirely retracted position with respect to the cone 37 of the rod 32 of the wheel 31.

It is also possible to perform an independent displacement of the tools or plate holders 21. To this end, each tool 21 is positioned on a different diameter, and that corresponding to the drive pin 19' is advantageously offset in height with respect to the other by about 0.5 mm or more, this latter tool being moreover positioned on a smaller diameter than that corresponding to the pin 19.

For this asymetric height adjustment, the drive wheel 31 will be pushed completely against the spring 39, and thus recessed from the bearing plane of the plate holders or tools 21, such that the pin 19' is no longer engaged in the corresponding groove 20, only the pin 19 remaining engaged. Displacement of the plate holder or tool 21 corresponding to the pin 19 is thus always effected through the intermediary of the adjusting screw 41, whereas that of the other tool or plate holder will be effected manually.

Rotation of the drive wheel 31 is limited by the possible displacement of the drive stud 42.

For mounting tools or plate holders 21, the drive wheel 31 must always be brought to its retracted position in the body by means of the cam screw 35, the tool 21 corresponding to pin 19 being first introduced and, following the foreseen machining process, the drive wheel is then freed or not for axial displacement.

According to another variation of the invention, not shown in the accompanying drawings, the wheel 31 may advantageously be provided on its surface direction toward the rod 32 with a conical toothed ring intended to cooperate with a conical adjustment pinion or key, removable if desired, a locking screw maintaining the wheel 31 in position after adjustment. Such an embodiment permits doing away with the adjustment screw 41 with its accessories.

Thanks to the invention, it is possible to realize a drilling head permitting great flexibility of use due to its various possible simple adjustments, while conserving a requisite strength of the assembly and maximum performance. Moreover, the invention permits doing away with a significant number of adjustment screws and thus also the corresponding keys, the adjustment and symmetrical displacement of two plate holders being able to be effected with only one screw and one key, with a very simple control instrument.

It will be understood that the invention is not limited to the embodiments described and shown in the accompanying drawings. Modifications remain possible, particularly from the point of view of the constitution of the various elements, or by substitution of equivalent techniques, without departing whatsoever from the scope of protection of the invention.

What is claimed is:

1. Drilling head comprising a body for fastening in a mounting support, means for mounting on said body a pair of radially movable tools, a casing mounted for axial displacement along a bore in said body, said casing being rotatable relative to said body about the axis of said bore, means for rotating said casing in said bore, means for moving said casing axially along said bore, said casing carrying means which are engageable with both tools of said pair of radially movable tools and which in one axial position of the casing along the bore move both tools in opposite axial directions upon rotation of the casing and which in another axial position of the casing along the bore contact only one tool to move said one tool radially relative to the other said tool upon rotation of the casing.

2. Drilling head according to claim 1, wherein said casing is a cylindrical element mounted in a receiving bore of said body such that it is adjustable in position, said cylindrical element comprising a first bore opening on a first surface of said casing directed toward a first end of said receiving bore, a second bore of greater diameter than and communicating and concentric with said first bore and opening on a second surface of said casing, a circular arc-shaped groove extending at least partially around said first bore and communicating with said second bore, a closed longitudinal groove extending parallel to the axis of and disposed on the periphery of said cylinder, a screw fixed in said body and cooperating with said groove to form a stop projection, and a plug preventing access to said screw.

3. Drilling head according to claim 2, wherein said casing comprises, on its periphery, two diametrally opposed conical holes cooperating with two conical-headed screws fixed in said body and displacing said casing toward said first end of said receiving bore, and on its said first surface, at regular intervals, holes for guiding and maintaining springs loading said first surface.

4. Drilling head according to claim 2, wherein said device for radial adjustment is a shouldered cylindrical element comprising: a lesser diameter portion having helicoidal gearing extending over at least a majority of its circumference, said lesser diameter portion being housed in said first bore of said casing; and a greater diameter portion in the form of a disk housed in said second bore of said casing and comprising two diametrally opposed holes for reception of pins cooperable with transverse grooves of the said tools to be adjusted, the said radial adjusting device being freely rotatably mounted in said casing by means of an elastic ring.

5. Drilling head according to claim 4, wherein said means for actuating said radial adjusting device is an endless screw positioned in a housing of said casing, tangent and perpendicular to said first bore and in meshing engagement with said helicoidal gearing of said radial adjusting device, said endless screw comprising a first end having an operable hexagonal recess accessible thorugh a hole of said body, and an opposite end having an elastic ring assuring retention of said endless screw in said housing.

6. Drilling head according to claim 4, wherein said greater diameter portion of said radial adjusting device comprises first and second parallel holes passing through said greater diameter portion from a first side to a second side thereof, said first and second holes having first and second pins respectively fixed therein, said first pin projecting from said first side and being flush with said second side, said second pin projecting from both said first and second sides a distance equal to about half of that by which said first pin projects, said second pin defining a range of possible axial displacement of said casing in said receiving bore of said body, said second pin penetrating, adjacent said second side, into said circular arc-shaped groove of said casing, and adjacent said first side, into said transverse groove of the said corresponding tool.

7. Drilling head according to claim 1, said means carried by the casing comprises a drive wheel rotatable in said casing relative to said casing and carrying diametrically opposed pins parallel to the axis of rotation of said wheel, said pins being adapted to be received in transverse grooves in said tools.

8. Drilling head according to claim 7, wherein said wheel comprises, opposite said tools, a rod having a free extremity comprising a wide circumferential groove for maintaining its height in said body, and into which groove penetrates a stop screw for limiting axial displacement of said wheel.

9. Drilling head according to claim 8, wherein said means for actuating axial displacemnt of said radial adjusting device is a cam screw having threading and extending orthogonally to the axis of said wheel and having a median portion comprising a clearing having an end opposite said threading of said screw in the form of a first cone cooperable with a second cone provided on said rod of said wheel between said groove and said wheel, a pin extending slightly into a housing for said cam screw limiting displacement of said cam screw in a direction of removal of said first cone from said secod cone.

10. Drilling head according to claim 8, wherein said free extremity of said rod of said wheel is loaded by an axial spring housed in a bore of said body.

11. Drilling head according to claim 8, wherein said drive wheel is driven in rotation by means of an adjustment screw extending orthogonally to said rod of said wheel, driving a stud having a housing cooperating with one of said pins passing thorugh said wheel, and maintained in its housing, against translation, by means of a pin cooperating with a throat provided at its extremity.

12. Drilling head according to claim 11, wherein said adjustment screw has a head comprising an operable hexagonal recess, and said head further comprises a conical surface provided with graduations.

13. Drilling head according to claim 8, wherein said wheel comprises, on a surface directed toward said rod, a conical toothed ring cooperable with a conical adjustment pinion or key, a clamping screw maintaining said wheel in position after adjustment.

* * * * *